(12) United States Patent
Tomita

(10) Patent No.: US 7,349,009 B2
(45) Date of Patent: Mar. 25, 2008

(54) VECTOR WAVEFORM CORRECTION DEVICE

(75) Inventor: Hiroyuki Tomita, Yokohama (JP)

(73) Assignee: Leader Electronics Corporation, Kanagawa-ken (JP)

( * ) Notice: Subject to any disclaimer, the term of this patent is extended or adjusted under 35 U.S.C. 154(b) by 0 days.

(21) Appl. No.: 11/562,477

(22) Filed: Nov. 22, 2006

(65) Prior Publication Data

US 2007/0076821 A1  Apr. 5, 2007

Related U.S. Application Data

(62) Division of application No. 10/873,303, filed on Jun. 23, 2004.

(30) Foreign Application Priority Data

Jun. 30, 2003 (JP) ............... 2003-186845

(51) Int. Cl.
*H04N 17/00* (2006.01)
*H04N 9/45* (2006.01)

(52) U.S. Cl. .................. 348/186; 348/194; 348/507

(58) Field of Classification Search ........ 348/505–507, 348/638–641, 186, 194, 727, 654; 345/440.1, 345/648; 324/76.11, 76.12, 121 R
See application file for complete search history.

(56) References Cited

U.S. PATENT DOCUMENTS

| | | | |
|---|---|---|---|
| 4,466,015 A * | 8/1984 | Wargo et al. ............... | 348/646 |
| 4,488,168 A | 12/1984 | Mino | |
| 4,489,877 A | 12/1984 | Sump | |
| 4,491,862 A * | 1/1985 | Flamm ........................ | 348/508 |
| 4,788,585 A * | 11/1988 | Suzuki ........................ | 348/194 |
| 4,875,089 A * | 10/1989 | Judge ......................... | 348/186 |
| 5,122,863 A | 6/1992 | Zortea | |
| 5,172,229 A * | 12/1992 | Baker ......................... | 348/186 |
| 5,175,614 A | 12/1992 | Proebstel | |
| 5,512,944 A | 4/1996 | Ikuzawa et al. | |
| 5,589,877 A * | 12/1996 | Ikuzawa et al. ............ | 348/186 |

FOREIGN PATENT DOCUMENTS

JP  07-312762  11/1995

OTHER PUBLICATIONS

Office Action mailed Dec. 4, 2006 (U.S. Appl. No. 10/873,303), 8 pages.

* cited by examiner

*Primary Examiner*—Victor R. Kostak
(74) *Attorney, Agent, or Firm*—Fish & Richardson P.C.

(57) ABSTRACT

A phase shifter (70) for correcting the phase of a sub-carrier signal input into a decoder to a burst signal has a phase shift setting (5), a correction amount setting (9'), a phase shifter (6) and a 90-degree phase shifter (7). The phase shift setting (5) holds a phase shift amount for all the scanning lines. The correction amount setting (9') holds a correction phase shift amount for every part of all the scanning lines. The phase shifter (6) partially shifts the phase of the sub-carrier signal in a unit of part of all the scanning lines, and shifts it in a unit of all the scanning lines, based on said phase shift amount and said correction phase shift amount. The 90-degree phase shifter (7) generates a sub-carrier signal orthogonal to said phase shifted sub-carrier signal.

1 Claim, 8 Drawing Sheets

VECTOR WAVEFORM CORRECTION DEVICE

BACKGROUND OF THE INVENTION

The present invention relates to a device for rotating a vector waveform in a vector waveform display of a vector scope, and more particularly to a device for correcting the position of a vector waveform in a rotational direction.

FIG. 1 is a schematic block diagram of a conventional vector scope that displays the vector waveform of a composite video signal. As shown in FIG. 1, the conventional vector scope comprises input means 1, Y/C separation means 2, synchronizing separation means 3, sub-carrier regenerating means 4, a phase shifter, decoder means 8, and display means 11.

The input means 1 inputs a composite video signal, and outputs the signal to the Y/C separation means 2, the synchronizing separation means 3 and the sub-carrier regenerating means 4. The Y/C separation means 2 extracts a chrominance signal of the composite video signal from the input composite video signal, employing a filter such as a band pass filter, a comb filter and a three dimensional filter, and outputs the chrominance signal to the decoder means 8. The synchronizing separation means 3 extracts a composite synchronizing signal within a synchronizing signal part of the composite video signal from the input composite video signal, employing a negative peak detection circuit. Moreover, the synchronizing separation means 3 separates the composite synchronizing signal into a vertical synchronizing signal and a horizontal synchronizing signal, employing a stable multi-vibrator etc., and generates a burst gate signal based on the vertical and horizontal synchronizing signals to output the burst gate signal to the decoder means 8. The sub-carrier regenerating means 4 generates a sub-carrier signal synchronous with the burst signal from the input composite video signal, employing a PLL, and outputs the sub-carrier signal to the phase shift means 6 in the phase shifter.

The shift amount setting means 5 in the phase shifter sets up a phase shift amount (i.e., an amount for rotating the vector waveform displayed on the display means 11) from the sub-carrier signal input into the phase shift means 6 to the sub-carrier signal output to the phase shift means 6, and outputs the shift amount to the phase shift means 6. The phase shift means 6 shifts the phase of the input sub-carrier signal in accordance with the input phase shift amount, employing a variable phase circuit such as a goniometer, shifts the phase of the input sub-carrier signal, and outputs the sub-carrier signal with phase shifted to 90 degree phase shifting means 7 and the decoder 8. The 90 degree phase shifting means 7 in the phase shifter generates the sub-carrier signal orthogonal to the input sub-carrier signal, employing a 90 degree phase circuit, and outputs the generated signal to the decoder 8. The decoder 8 demodulates the chrominance signal input from the Y/C separation means 2 into color difference signals (an R-Y signal and a B-Y signal), employing the sub-carrier signal input from the phase shift means 6 and the sub-carrier signal input from the 90 degree phase shifting means 7 (i.e., sub-carrier signals orthogonal to each other), and outputs the color difference signals to the display means 11. The display means 11 displays the Lissajour figure with the B-Y signal of the input color difference signals as x axis and the R-Y signal as y axis.

One example of the conventional vector scope was disclosed in Japanese Patent Laid-Open No. 7-312762. The vector scope as described in Japanese Patent Laid-Open No. 7-312762 comprises the improved phase shifter.

[Patent document 1]

Japanese Patent Laid-Open No. 7-312762 (page 3, paragraph 2)

SUMMARY OF THE INVENTION

If the user operates the shift amount setting means 5 (e.g., the user manually rotates a phase shifting knob), the vector scope rotates a vector waveform displayed on the display means 11. For this operation, it is presupposed that the phase of the sub-carrier signal input into the decoder 8 to the burst signal is matched all over the scanning lines at the time of designing the vector scope. In other words, after the vector scope is sold to the user, and before the user manually rotates the phase shifting knob (or in a state where the shift amount setting means 5 and the phase shift means 6 are inactive), it is required that the phase of the sub-carrier signal input into the decoder 8 to the burst signal is matched with a predetermined value. (In this specification, "all the scanning lines" means the scanning lines that exist within a pair of alternating color frames, for example, in the case of a PAL video signal, the total number of scanning lines is 1250, and in the case of an NTSC video signal, the total number of scanning lines is 1050.)

However, due to several causes, the phase of the sub-carrier signal input into the decoder 8 to the burst signal may be unmatched all over the scanning lines. That is, of one pair of alternating color frames, the phase corresponding to the odd lines belonging to a color frame A (phase corresponding to the odd field belonging to the color frame A of one pair of alternating color frames) may not be matched with the predetermined value. Or of one pair of alternating color frames, the phase corresponding to the even lines belonging to the color frame A (phase corresponding to the even field belonging to the color frame A of one pair of alternating color frames) may not be matched with the predetermined value. Or of one pair of alternating color frames, the phase corresponding to the odd lines belonging to a color frame B (phase corresponding to the even field belonging to the color frame B of one pair of alternating color frames) may not be matched with the predetermined value. Or of one pair of alternating color frames, the phase corresponding to the even lines belonging to the color frame B (phase corresponding to the odd field belonging to the color frame B of one pair of alternating color frames) may not be matched with the predetermined value.

In such cases, the vector waveform displayed on the display means 11 is partially rotated (depending on the color frame attribute and the line attribute). In other words, when the composite video signal is the color bar signal, the position of the vector wave displayed on the display means 11 (e.g., position representing each of magenta, red, yellow, green, cyan and blue within the color bar signal) is partially deviated from the predetermined position in the rotational direction.

FIG. 2 shows a vector display example of the PAL color bar signal when the phase of the sub-carrier signal to the burst signal is not fully matched. As shown in FIG. 2, the position of the vector wave displayed on the display means 11 (position representing each of magenta (Mg), red (R), yellow (Yl), green (G), cyan (Cy) and blue (B) within the color bar signal) is deviated from the predetermined position (21) in the rotational direction (see the arrow 20 in FIG. 2). A vector scope in this state can not exhibit the proper function, and can not be sold to a user.

Accordingly, it is an object of the invention to enable the vector scope to operate normally, even when the phase of the sub-carrier signal input into the decoder to the burst signal is not fully matched.

It is another object of the invention to display the vector waveform for the composite video signal normally.

Other objects of the invention will be apparent from the description of this specification.

To accomplish the above object, this invention provides a vector waveform correction device (30) for correcting a vector waveform displayed on a vector scope. The vector waveform correction device (30) of the invention comprises means (10) for inputting a first color difference signal (B-Y signal) and a second color difference signal (R-Y signal) demodulated from a chrominance signal of a composite video signal as x and y, and partially rotating a vector (x, y)=(first color difference signal, second color difference signal) in a unit of part of all the scanning lines. Preferably, the vector waveform correction device (30) according to the invention further comprises correction amount setting means (9) for holding a correction amount θ for every part of the scanning lines, wherein the means (10) for rotating the vector (x,y) is affine transformation means (10) for generating a vector (x', y')=(x·cosθ−y·sinθ, x·sinθ+y·cosθ) from the vector (x, y).

The means (10) for rotating the vector (x, y) may partially rotate the vector (x, y)=(first color difference signal, second color difference signal) in a unit of part of all the scanning lines, and rotate it in a unit of all the scanning lines. In this case, preferably, the vector waveform correction device (30) according to the invention further comprises rotation amount setting means (5') for holding a rotation amount α for all the scanning lines, wherein the means (10) for rotating the vector (x,y) is affine transformation means (10) for generating a vector (x',y')=(x·cos(θ+α)−y·sin(θ+α), x·sin(θ+α)+y·cos(θ+α)) from the vector (x,y).

The means (10) for rotating the vector (x,y) in the vector waveform correction device (30) according to the invention may partially rotate a vector (x, y)=(first color difference signal, second color difference signal) depending on a color frame attribute and a line attribute. More specifically, the means (10) for rotating the vector (x,y) rotates the vector (x,y) belonging to color frame A and odd line by a first predetermined amount, the vector (x,y) belonging to color frame A and even line by a second predetermined amount, the vector (x,y) belonging to color frame B and odd line by a third predetermined amount, and the vector (x,y) belonging to color frame B and even line by a fourth predetermined amount.

Also, to accomplish the above object, this invention provides a phase shifter (70) for correcting the phase of a sub-carrier signal input into a decoder to a burst signal. The phase shifter (70) of the invention comprises phase shift setting means (5) for holding a phase shift amount for all the scanning lines, correction amount setting means (9') for holding a correction phase shift amount for every part of all the scanning lines, phase shift means (6) for partially shifting the phase of the sub-carrier signal in a unit of part of all the scanning lines, and shifting it in a unit of all the scanning lines, based on the phase shift amount and the correction phase shift amount, and 90 degree phase shift means (7) for generating a sub-carrier signal orthogonal to the shifted sub-carrier signal.

DETAILED DESCRIPTION OF THE INVENTION

The embodiments of the present invention will be described below with reference to the accompanying drawings.

Figure 3:
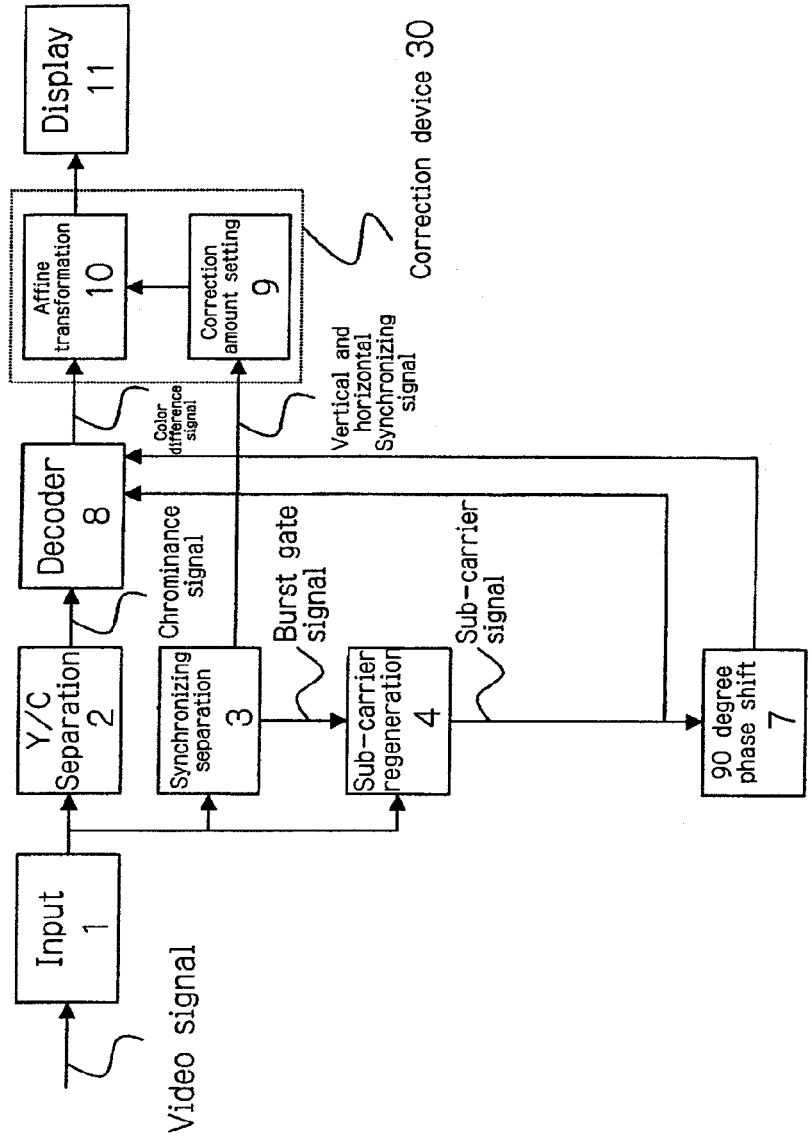
FIG. 3 is a schematic block diagram of a vector scope having a vector waveform correction device according to the invention.
Figure 4:
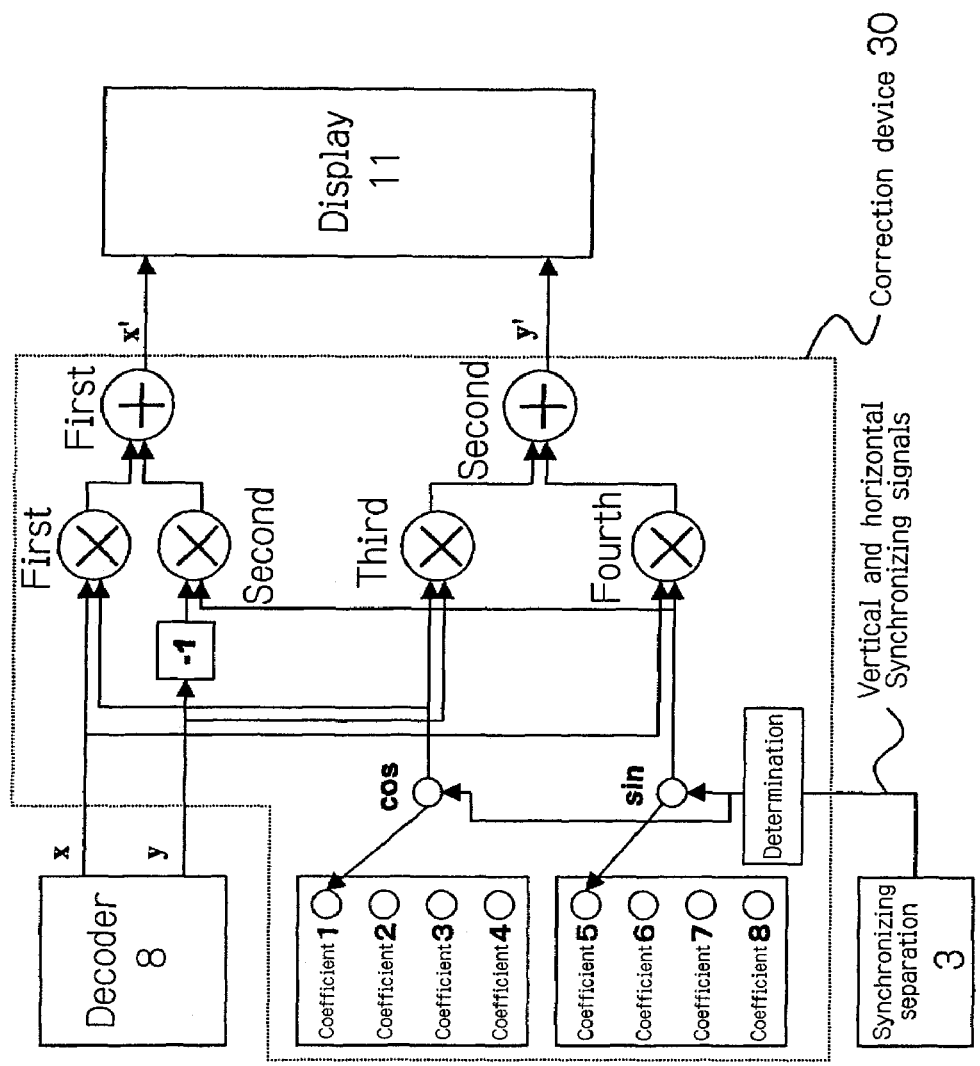
FIG. 4 is a specific block diagram of the vector waveform correction device according to the invention as shown in FIG. 3.

FIG. 3 is a schematic block diagram of a vector scope having a vector waveform correction device 30 according to the invention. FIG. 4 is a specific block diagram of the vector waveform correction device 30 according to the invention as shown in FIG. 3.

Figure 1:
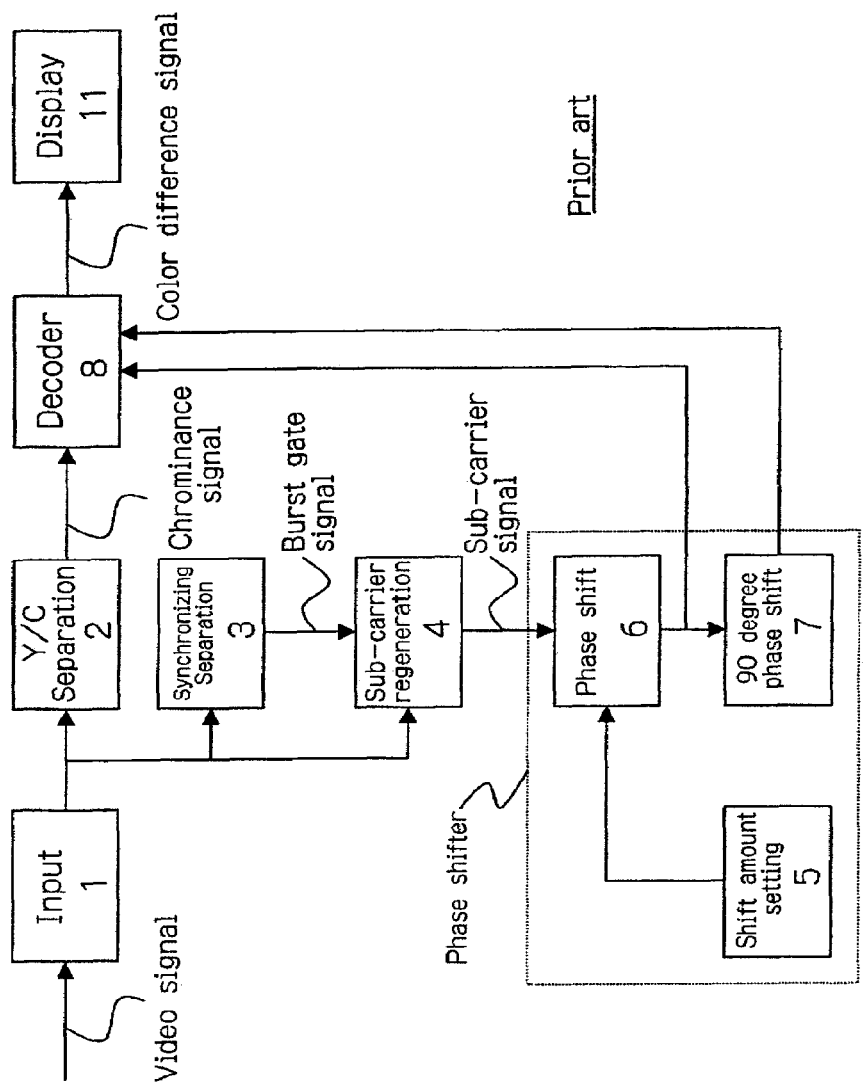
FIG. 1 is a schematic block diagram of a conventional vector scope that displays the vector waveform of a composite video signal.

The vector scope as shown in FIG. 3 does not comprise the shift amount setting means 5 and the phase shift means 6 as shown in FIG. 1. In other words, the vector scope as shown in FIG. 3 can not rotate the vector waveform displayed on the display means 11 on the user's volition.

The functions of the input means 1, the Y/C separation means 2, the synchronizing separation means 3, the sub-carrier regenerating means 4, the 90 degree phase shift means 7, the decoder means 8 and the display means 11 in the vector scope as shown in FIG. 3 are the same as those of the vector scope as shown in FIG. 1. Accordingly, detailed description of these means is omitted. The synchronizing separation means 3 as shown in FIG. 3 is an improvement of the synchronizing separation means 3 as shown in FIG. 1. The synchronizing separation means 3 as shown in FIG. 3 outputs a vertical synchronizing signal and a horizontal synchronizing signal to correction amount setting means 9.

The vector waveform correction device 30 of the invention comprises the correction amount setting means 9 and affine transformation means 10, as partially shown in FIG. 3.

Determination means for the correction amount setting means 9 inputs the vertical synchronizing signal and the horizontal synchronizing signal from the synchronizing separation means 3, as shown in FIGS. 3 and 4. The determination means for the correction amount setting means 9 determines which of the color frames A and B a video signal displayed on the display means 11 belongs to, and further determines which of the odd and even lines the video signal belongs to, based on the input vertical synchronizing signal and horizontal synchronizing signal. That is, the determination means for the correction amount setting means 9 determines to which category the video signal displayed on the display means 11 belongs from among the categories, including 1) color frame A and odd line, 2) color frame A and even line, 3) color frame B and odd line, and 4) color frame B and even line, and outputs the determination result to the affine transformation means 10.

The correction amount setting means 9 holds, for every category, the amount (i.e., correction amount θ) of rotating the vector waveform which is displayed on the display means 11 and corresponds only the video signal belonging to the relevant category.

The affine transformation means 10 transforms the color difference signals from the decoder 8 in accordance with the following formula (1), so that the vector waveform displayed on the display means 11 may be rotated, based on the correction amount θ corresponding to the category to which the video signal belongs, depending on the category.

$$x' = x \cdot \cos\theta - y \cdot \sin\theta$$

$$y' = x \cdot \sin\theta + y \cdot \cos\theta \quad \text{(Formula 1)}$$

Where x denotes the B-Y signal of the color difference signals before correction, y denotes the R-Y signal of the color difference signals before correction, x' denotes the B-Y signal of the color difference signals after correction, and y' denotes the R-Y signal of the color difference signals after correction.

The affine transformation means 10 outputs the color difference signals after correction to the display means 11. The display means 11 displays with the B-Y signal (x') of the input color difference signals as the x axis and the R-Y signal (y') as the y axis.

Referring to FIG. 2 again, the designer could understand, at the time of design, that only the vector wave corresponding to the categories of 1) color frame A and odd line and 4) color frame B and even line is deviated from the predetermined position (21) in the rotation direction (see the arrow 20 in FIG. 2). Also the designer could understand that the vector wave corresponding to the categories of 2) color frame A and even line and 4) color frame B and odd line is located at the predetermined position (21).

Then, the designer can understand that only the vector wave corresponding to the categories 1) and 4) is deviated by −3 degrees from the predetermined position (21) in the rotation direction from a marker (21) at the predetermined position displayed on the display means.

Figure 2:
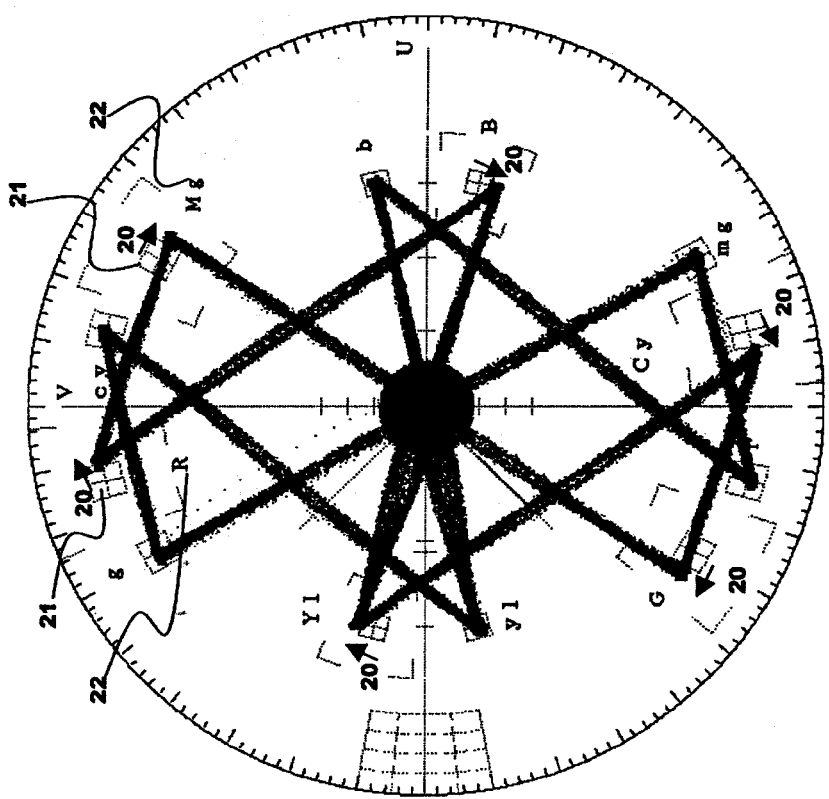
FIG. 2 is a view showing a vector display example of a PAL color bar signal when the phase of a sub-carrier signal with the burst signal is not fully matched.

Accordingly, the designer may set up a correction amount θ of 3 degrees in the correction amount setting means 9 for the categories 1) and 4) in an example of FIG. 2. Also, the designer may set up a correction amount θ of 0 degree (without correction) in the correction amount setting means 9 for the categories 2) and 3). If such a correction amount is set up in the correction amount setting means 9, only the vector wave corresponding to the categories of 1) color frame A and odd line in FIG. 2 and 4) color frame B and even line is rotated by 3 degrees, so that the vector wave corresponding to the categories 1) and 4) is moved to the predetermined position (21) (see FIG. 5 and the arrow 50 in FIG. 5).

Figure 5:
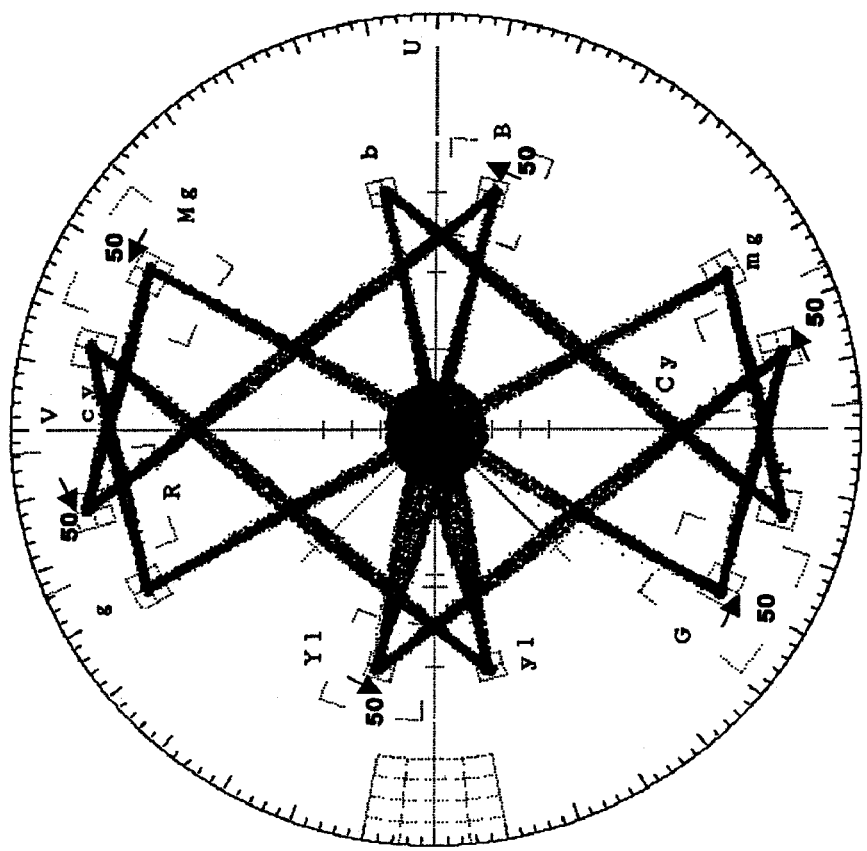
FIG. 5 is a view showing a vector display example of a PAL color bar signal when the phase of the sub-carrier signal to the burst signal is corrected.

In this way, the position of the vector wave displayed on the display means 11 is partially corrected (depending on the color frame attribute and the line attribute) at the time of design, in which it is meant that the phase of the sub-carrier signal to the burst signal is partially corrected. Accordingly, FIG. 5 is a vector display example of a PAL color bar signal when the phase of the sub-carrier signal to the burst signal is corrected. As shown in FIG. 5, the vector waveform displayed on the display means 11 is partially rotated, so that the composite video signal is display in the vector waveform normally. At the time of design, once the correction amount θ is fixed, the user can perform the same operation as the normal vector scope without being aware of the correction.

Referring to FIG. 4 again, the determination means for the correction amount setting means 9 determines to which category the video signal displayed on the display means 11 belongs among the categories, including 1) color frame A and odd line, 2) color frame A and even line, 3) color frame B and odd line, and 4) color frame B and even line, and outputs the determination result to a sin coefficient change-over switch and a cos coefficient change-over switch of the affine transformation means 10.

Coefficient holding means of the correction amount setting means 9 holds the sin coefficient (coefficient 5) and the cos coefficient (coefficient 1) corresponding to the category of 1) color frame A and odd line, and also holds the sin coefficient (coefficient 6) and the cos coefficient (coefficient 2) corresponding to the category of 2) color frame A and even line. Moreover, coefficient holding means of the correction amount setting means 9 holds the sin coefficient (coefficient 7) and the cos coefficient (coefficient 3) corresponding to the category of 3) color frame B and odd line, and also holds the sin coefficient (coefficient 8) and the cos coefficient (coefficient 4) corresponding to the category of 4) color frame B and even line.

In the example of FIG. 2, the correction amount θ=3° for the categories of 1) and 4), and the correction amount θ=0° for the categories of 2) and 3). Accordingly, coefficient 1=cos(3°)=0.9986, coefficient 2=cos(0°)=1, coefficient 3=cos(0°)=1, coefficient 4=cos(3°)=0.9986, coefficient 5=sin(3°)=0.0523, coefficient 6=sin(0°)=0, coefficient 7=sin(0°)=0, and coefficient 8=sin(3°)=0.0523.

The sin coefficient change-over switch operates to select the sin coefficient within the coefficient holding means of the correction amount setting means 9, based on the category determination result. Similarly, the cos coefficient change-over switch operates to select the cos coefficient within the coefficient holding means of the correction amount setting means 9, based on the category determination result. That is, the coefficients 1 and 5 are selected in the case of the category 1), and the coefficients 2 and 6 are selected in the case of the category 2). Moreover, the coefficients 3 and 7 are selected in the case of the category 3), and the coefficients 4 and 8 are selected in the case of the category 4).

In the case where the video signal displayed on the display means 11 belongs to the category of 1) color frame A and odd line, a first multiplier of the affine transformation means 10 multiplies the B-Y signal from the decoder 8 and a signal corresponding to coefficient 1 from the cos coefficient change-over switch, and outputs the multiplied signal to a first adder. In the case where the video signal displayed on the display means 11 belongs to the category of 2) color frame A and even line, the first multiplier of the affine transformation means 10 inputs a signal corresponding to coefficient 2 from the cos coefficient change-over switch. In the case where the video signal belongs to the categories of 3) and 4), the first multiplier of the affine transformation means 10 inputs a signal corresponding to coefficients 3 and 4.

In the case where the video signal displayed on the display means 11 belongs to the category 1), a second multiplier of the affine transformation means 10 multiplies the R-Y signal from the decoder 8 multiplied by −1 and a signal corresponding to coefficient 5 from the sin coefficient change-over switch, and outputs the resulting signal to the first adder. In the case where the video signal belongs to the categories of 2), 3) and 4), the second multiplier of the affine transformation means 10 inputs a signal corresponding to coefficients 6, 7 and 8.

In the case where the video signal displayed on the display means 11 belongs to the category 1), a third multiplier of the affine transformation means 10 multiplies the R-Y signal from the decoder 8 and a signal corresponding to coefficient 1 from the cos coefficient change-over switch, and outputs the multiplied signal to a second adder. In the case where the video signal belongs to the categories of 2), 3) and 4), the third multiplier of the affine transformation means 10 inputs a signal corresponding to coefficients 2, 3 and 4.

In the case where the video signal displayed on the display means 11 belongs to the category 1), a fourth multiplier of the affine transformation means 10 multiplies the B-Y signal from the decoder 8 and a signal corresponding to coefficient 5 from the sin coefficient change-over switch, and outputs the multiplied signal to the second adder. In the case where the video signal belongs to the categories of 2), 3) and 4), the third multiplier of the affine transformation means 10 inputs a signal corresponding to coefficients 6, 7 and 8.

The first adder adds the signal from the first multiplier and the signal from the second multiplier, and outputs the signal (x') as the B-Y signal to the display means 11. The second adder adds the signal from the third multiplier and the signal from the fourth multiplier, and outputs the signal (y') as the R-Y signal to the display means 11. In this way, the formula 1 is materialized.

It is to be noted that the affine transformation means 10 transforms the color difference signals from the decoder 8 in accordance with the formula (1), so that the vector waveform displayed on the display means 11 may be rotated, based on the correction amount θ corresponding to the category to which the video signal belongs. This is because the vector waveform displayed on the display means 11 is not rotated in a unit of all the scanning lines, but is partially rotated in a unit of part of all the scanning lines. Conversely, the affine transformation means not dependent on the category can rotate the vector waveform displayed on the display means 11 in a unit of all the scanning lines. Accordingly, the affine transformation means also having the function of the phase shift means 6 as shown in FIG. 1 may be employed.

Figure 6:
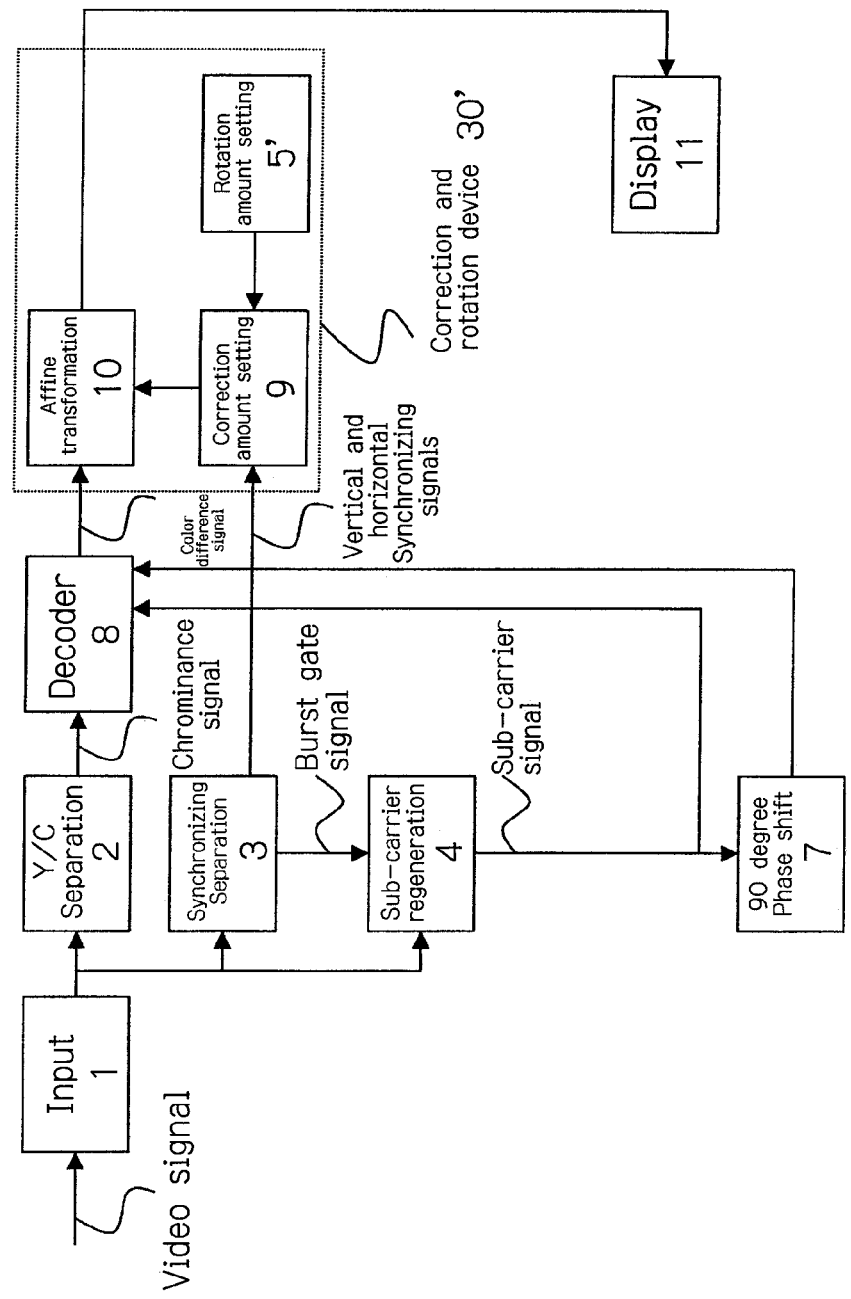
FIG. 6 is a schematic block diagram of the vector scope of FIG. 3 having rotation amount setting means.

FIG. 6 is a schematic block diagram of the vector scope of FIG. 3 further comprising a vector waveform correction and rotation device (a device having the functions of the shift amount setting means 5 and the phase shift means 6 as shown in FIG. 1).

The vector scope as shown in FIG. 6 further comprises rotation amount setting means 5', in contrast to the vector scope as shown in FIG. 3. The rotation amount setting means 5' (and the affine transformation means 10) as shown in FIG. 6 corresponds to the shift amount setting means 5 (and the phase shift means 6) as shown in FIG. 1. In other words, the vector scope as shown in FIG. 6 can rotate the vector waveform displayed on the display means 11 in a unit of all the scanning lines on the user's volition.

The functions of the input means 1, the Y/C separation means 2, the synchronizing separation means 3, the sub-carrier regenerating means 4, the 90 degree phase shift means 7, the decoder means 8, the correction amount setting means 9, the affine transformation means 10 and the display means 11 in the vector scope as shown in FIG. 6 are the same as those of the vector scope as shown in FIG. 1.

The rotation amount setting means 5' of the vector waveform correction and rotation device 30' sets the amount of rotating the vector waveform displayed on the display means 11 in a unit of all the scanning lines (rotation amount α for all the scanning lines), and outputs the rotation amount to the correction amount setting means 9.

The correction amount setting means 9 adds the rotation amount α to the total correction amount θ dependent on the category. In other words, the correction amount setting means 9 holds the correction amount θ dependent on the category and the rotation amount α not dependent on the category.

The affine transformation means 10 transforms the color difference signals from the affine transformation means 10 in accordance with the following formula 2, so that the vector waveform displayed on the display means 11 may be rotated, based on the correction amount θ and the rotation amount α.

$$x' = x \cdot \cos(\theta+\alpha) - y \cdot \sin(\theta+\alpha)$$

$$y' = x \cdot \sin(\theta+\alpha) + y \cdot \cos(\theta+\alpha) \quad \text{(Formula 2)}$$

Where x denotes the B-Y signal of the color difference signals before correction and rotation, y denotes the R-Y signal of the color difference signals before correction and rotation, x' denotes the B-Y signal of the color difference signals after correction and rotation, and y' denotes the R-Y signal of the color difference signals after correction and rotation.

The affine transformation means 6' outputs the color difference signals after correction and rotation to the display means 11. The display means 11 displays with the B-Y signal (x') of the input color difference signals as the x axis and the R-Y signal (y') as the y axis.

If the user operates the rotation amount setting means 5' (e.g., the user manually rotates a rotation knob), the vector scope rotates the vector waveform displayed on the display means 11 in a unit of all the scanning lines.

It is to be noted that in the vector scope as shown in FIG. 1, due to some cause, the phase of the sub-carrier signal input into the decoder 8 to the burst signal may be unmatched all over the scanning lines. Thus, the function of the correction amount setting means 9 as shown in FIG. 6 may be built into the phase shifter.

Figure 7:
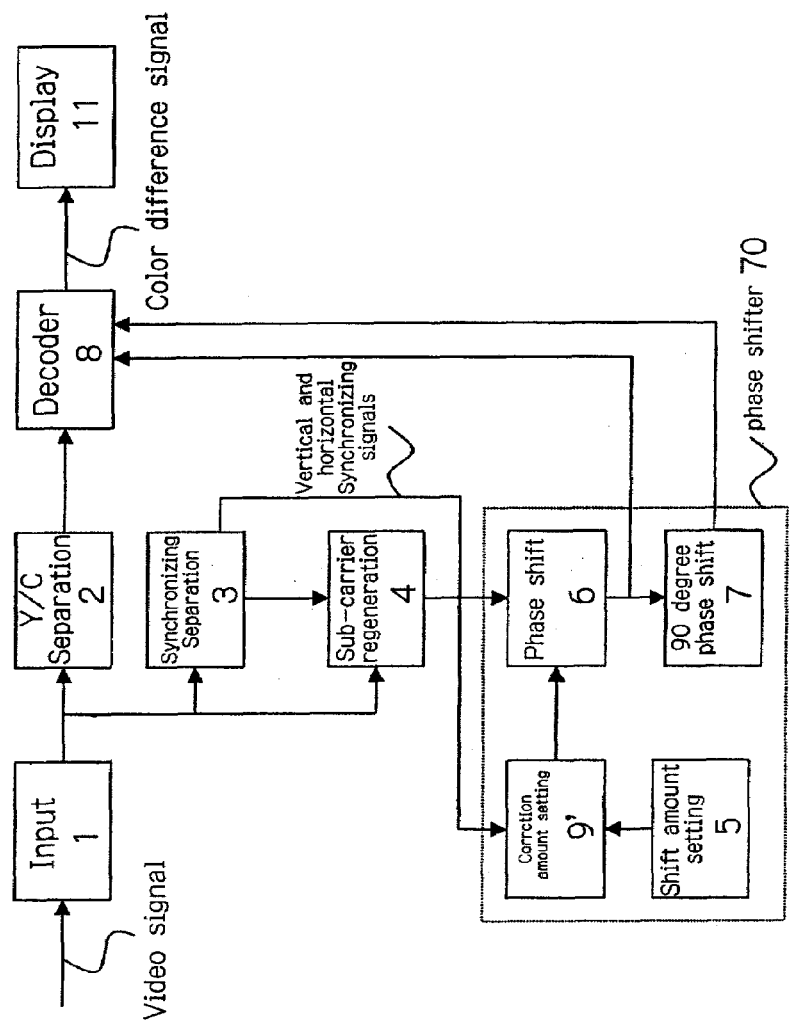
FIG. 7 is a schematic block diagram of the vector scope of FIG. 1 having correction amount setting means.

FIG. 7 is a schematic block diagram of the vector scope of FIG. 1 further having correction amount setting means.

The correction amount setting means 9' as shown in FIG. 7, like the correction amount setting means 9 as shown in FIG. 6, inputs a vertical synchronizing signal and a horizontal synchronizing signal from the synchronizing separation means 3, determines the category for the video signal, and stores the correction phase shift amount dependent on the category. The correction amount setting means 9' inputs from the shift setting means 5 the phase shift amount to rotate the vector waveform displayed on the display means 11 in a unit of all the scanning lines. The correction amount setting means 9' outputs the shift amount that is addition of the correction phase shift amount and the phase shift amount to the phase shift means 6. The phase shift means 6 shifts the phase of sub-carrier signal in accordance with the input shift amount.

Figure 8:
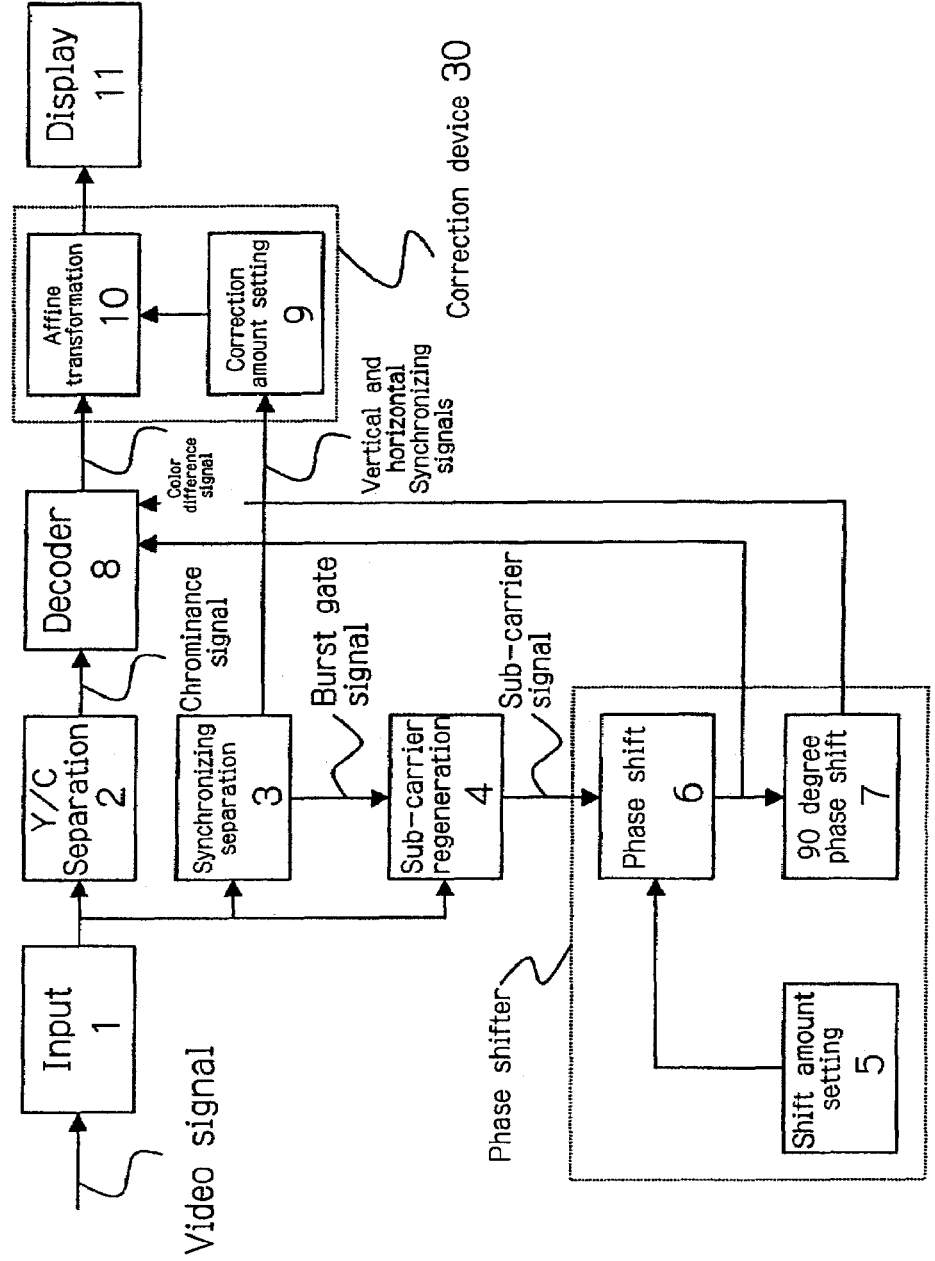
FIG. 8 is a schematic block diagram of the vector scope having phase shift means and affine transformation means.

It is to be noted that since the correction amount setting means 9' as shown in FIG. 7 corresponds to the correction amount setting means 9 as shown in FIG. 6, the vector scope as shown in FIG. 8 comprising the phase shift means and the affine transformation means maybe employed. The vector scope as shown in FIG. 8 exhibits the same functions as the vector scope as shown in FIG. 6 or 7.

It should be understood that the present invention is not limited to the plurality of illustrated examples described above, and the examples may be modified in various manners without departing from the spirit of the invention.

What is claimed is:

1. A phase shifter for correcting the phase of a sub-carrier signal input into a decoder to a burst signal, comprising:

phase shift setting means for holding a phase shift amount for all the scanning lines;

correction amount setting means for holding a correction phase shift amount for every part of all the scanning lines;

phase shift means for partially shifting the phase of the sub-carrier signal in a unit of part of all the scanning lines, and shifting it in a unit of all the scanning lines, based on said phase shift amount and said correction phase shift amount; and 90 degree phase shift means for generating a sub-carrier signal orthogonal to said phase shifted sub-carrier signal.

* * * * *